Figure 3:
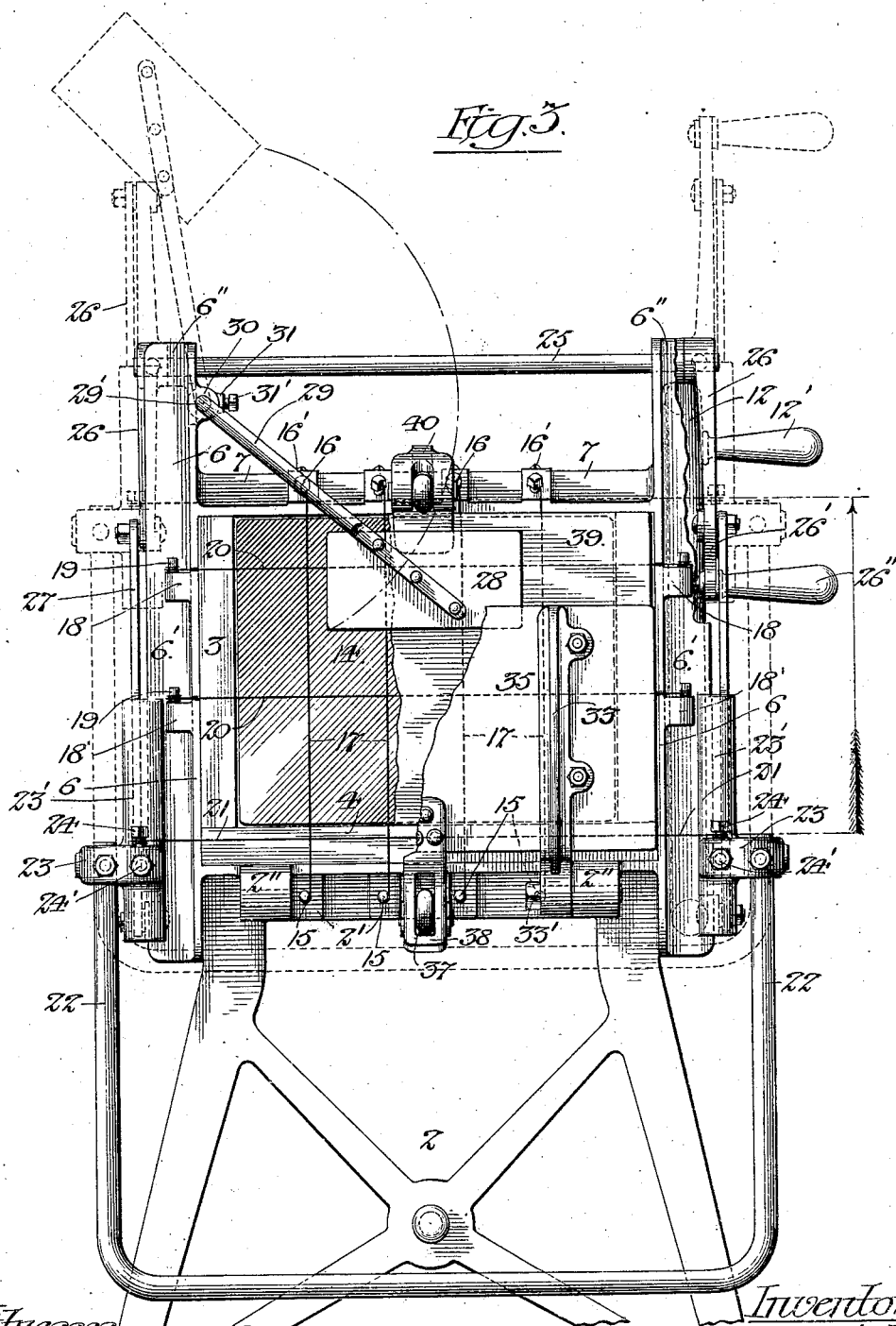

No. 845,468. PATENTED FEB. 26, 1907.
F. J. MACNISH & W. E. PENN.
BUTTER CUTTER.
APPLICATION FILED JAN. 3, 1905.
2 SHEETS—SHEET 1.
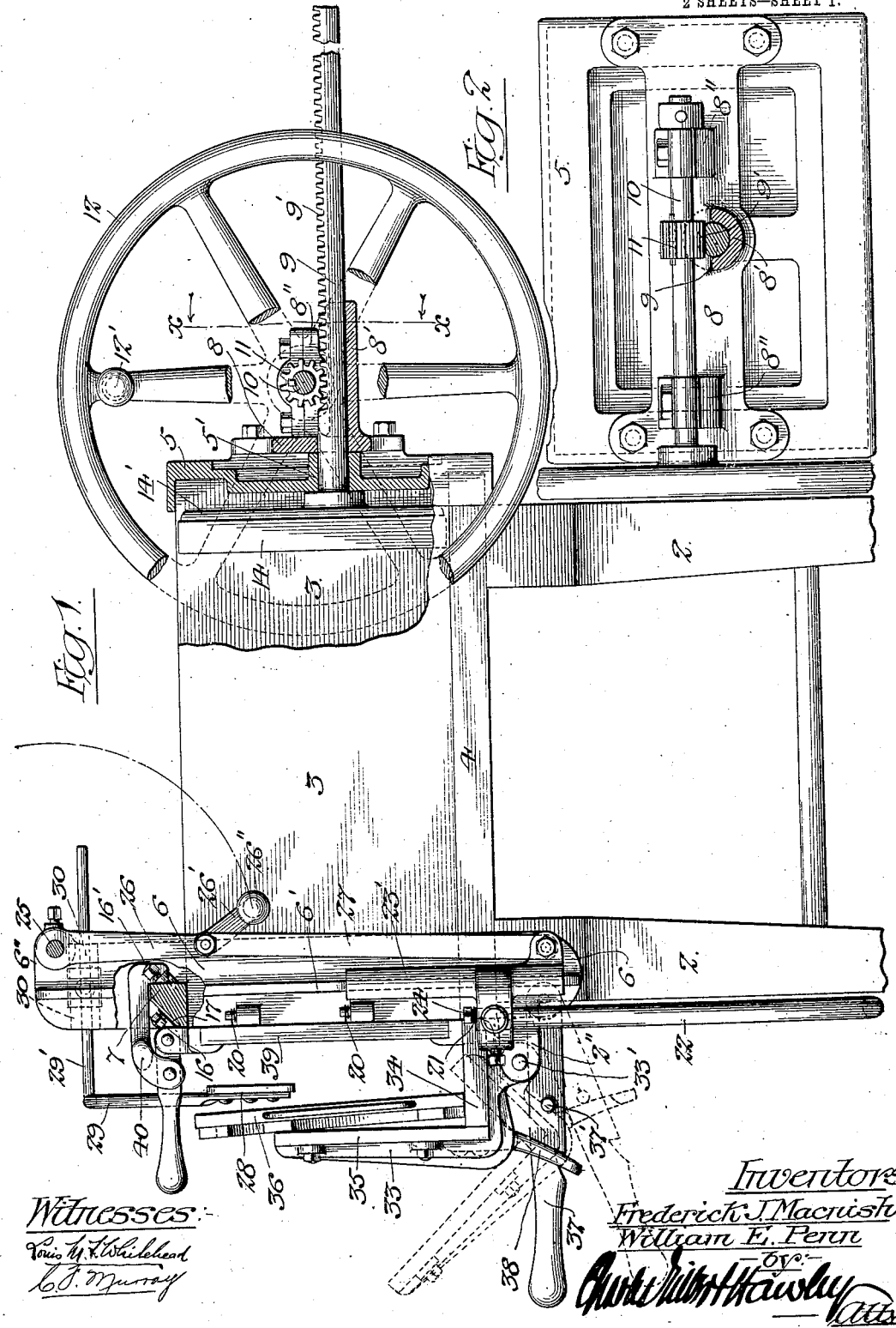
Witnesses:—
Inventors
Frederick J. Macnish
William E. Penn No. 845,468. PATENTED FEB. 26, 1907.
F. J. MACNISH & W. E. PENN.
BUTTER CUTTER.
APPLICATION FILED JAN. 3, 1905.

2 SHEETS—SHEET 2.

Witnesses Inventors
Frederick J. Macnish
William E. Penn
by Charles Hubert Hawley
Atty.

UNITED STATES PATENT OFFICE.

FREDERICK J. MACNISH, OF OAK PARK, ILLINOIS, AND WILLIAM E. PENN, OF LAKEMILLS, WISCONSIN, ASSIGNORS TO THE CREAMERY PACKAGE MFG. COMPANY, OF CHICAGO, ILLINOIS, A CORPORATION OF ILLINOIS.

BUTTER-CUTTER.

No. 845,468.     Specification of Letters Patent.     Patented Feb. 26, 1907.

Application filed January 3, 1905. Serial No. 239,450.

*To all whom it may concern:*

Be it known that we, FREDERICK J. MACNISH and WILLIAM E. PENN, citizens of the United States, residing at Oak Park, Cook county, Illinois, and Lakemills, Jefferson county, Wisconsin, respectively, have invented a new, useful, and Improved Butter-Cutter, of which the following is a full, clear, and exact description, such as will enable others skilled in the art to which it appertains to make and use the same.

Our invention relates to improvements upon machines for cutting or printing butter, and has special reference to an improved mechanism for cutting or forming butter prints or bricks from butter in bulk form.

The object of the invention is to provide a butter cutter or printer which shall be of simple and durable construction and of large capacity and which may be operated with ease and rapidity.

The particular object of the invention is to provide a butter-printer for use in large creameries or butter factories where great quantities of butter must be printed and prepared for the market during certain hours each day.

A further particular object of the invention is to provide a butter-cutter of compact form, which shall occupy little space, and which shall be of proper height to facilitate the work of the operator of the machine.

Our invention consists, generally, in a butter cutter or printer comprising a suitable frame and a butter-box mounted thereon in combination with a plunger or butter expelling device arranged in said box, butter-cutting wires arranged across the end of the box, a vertically-movable butter-severing device, a print-gage, a butter-receiving device, and mechanism for operating the several movable elements of the mahcine above mentioned.

The invention consists, further, in various constructions and combinations of parts, all as hereinafter described, and particularly pointed out in the claims.

The invention will be more readily understood by reference to the accompanying drawings, forming a part of this specification, and in which—

Figure 1 is a side elevation of a butter printing or cutting machine embodying our invention, the rear of the butter-box being broken away to show the construction of the plunger and associated parts. Fig. 2 is an elevation of the rear end of the butter-box substantially on the line x x of Fig. 1, and Fig. 3 is a front end elevation of the machine with parts broken away to show a portion of the interior of the butter-box.

Upon referring to the drawings it will be seen that the butter-box of our machine is mounted upon a high frame 2, the box comprising the sides 3 3, the bottom 4, and the end 5. The bottom board 4 extends across and forms the top of the frame 2. At the front end are two uprights or standards 6 6, attached to the frame 2 and at the top connected by a cross-bar 7. The end 5 is a metal casting, attached to the bottom board 4, and this metal casting 5 and the standards 6 6 hold the side boards 3 3, all parts being bolted or secured together. The rear end 5 contains a bearing 5', and to it is attached a cross-brace or plate 8, having a bearing portion 8' in line with the bearing 5', the two serving to accommodate the plunger stem or rod 9. Said rod or stem 9 is formed of a bar, circular in cross-section, but having its top machined to form the gear teeth or rack 9'. The cross-plate 8, attached to end 5, is provided with bearings 8'', and these contain the power or driving shaft 10. On the shaft is a pinion 11, meshing with the integral rack on the plunger-rod 9, and the parts are driven by means of a large hand-wheel 12, arranged on the outer end of the shaft 10. 12' is the crank-handle on wheel 12. 14 is the plunger or butter-expelling device, arranged in the butter-box and comprising a wooden board attached to the metal plate 14', whereto the inner end of the plunger-stem 9 is secured. By turning the wheel 12 the plunger may be reciprocated in the box with sufficient rapidity to properly fulfil its intended office. The metal front of the frame is provided with a cross portion 2', having lugs 2'', described hereinafter. The cross-bar 2' and the cross-bar 7 are provided with regularly-spaced pins 15 and 16, respectively. The pins 15 may be fixed in the cross-bar 2'; but the pins 16 preferably have non-threaded shanks and are adapted to be turned in the bar 7. Butter-cutting wires 17 are stretched between opposite pins 15 and 16, being attached to both pins in each case. When the wires have been drawn taut by turning the pins 16, said pins are secured by means of set-screws 16', arranged in the back of the bar 7. (See Fig. 1.) The standards 6 6 have lugs 18 18', provided with pins 19, on which are secured the horizontal butter-cutting wires 20 20. The distance between the wires 20 20 and between the lower wire 20 and the upper surface of the box-bottom is the same and is equal to the ordinary length of a print or brick of butter. The horizontal distance between the vertical wires represents the usual width of the ordinary butter print or brick.

It will be observed that the front edges of the metal parts 2', 6, 6, and 7 are in the same vertical plane, and the pins are set back of said plane so that no portion projects beyond said plane. It may be here remarked that the parts 2', 6, 6, and 7 are preferably formed in a single casting, which may be either integral with the front portion of the frame 2 or bolted thereto, as desired. It will be obvious that when the butter-box is packed full of butter and when the plunger is forced forward butter will be forced out through the end of the box and the mass will be cut into a plurality of strips as it passes the cutting-wires 17 and 20. When a sufficient quantity of butter has been expelled from the box and partially severed by the vertical and horizontal wires, it is then necessary to completely sever the same by cutting means upon its vertical plane. We accomplish this by means of a horizontal wire 21, which is stretched across the front end of the machine, being held by the end of the spring yoke or bow 22. This bow possesses considerable resilience, and it is obvious that such resilience will operate to stretch the wire taut. The wire is guided vertically, and its ends are directly held by blocks 23, attached to the ends of the bow 22 and provided with vertical guide portions 23'. 24 are the screws or pins for securing the vertical cutting-wire 21, and 24' are screws for securing the pins 24 after they are adjusted. The guide portions 23' of the blocks 23 are provided with slots and are held by the vertical flanges of guides 6', formed upon the sides of the standards 6. These parts of said standards are planed smooth. The bow 22 serves to keep the wires taut, while the blocks 23 and guides 6' serve to guide the wire and retain it in a vertical plane. The vertical movement of the wire 21 is brought about by means of a rock-shaft 25, having bearings 6'' in the upper ends of standards or columns 6. Crank-arms 26 26 are attached to the ends of this shaft, and these arms are connected with the blocks 23 by links 27. (See Figs. 1 and 3.) One of the arms 26 is provided with an angular portion 26', to which is attached the operating crank or handle 26''. When this handle is moved or turned, as shown by the dotted curve in Fig. 1, both arms 26 26 will be raised, thereby lifting the links 27, the blocks 23, and the cross-cut wire 21. The movement is the same on the two sides of the machine, and the action of the mechanism is both rapid and accurate.

The butter which is forced out of the box by the movement of the plunger is temporarily supported by a receiving-board and rests thereon until the bricks of butter have been completely severed from the mass by the vertical movement of the cut-off wire 21.

For the purpose of determining the thickness of the butter prints or bricks and for making successive lots of prints uniform we employ a gage-plate 28, occupying a vertical plane and arranged on the swinging arm 29. This arm has a horizontal portion 29', that is held in ears or lugs 30 on the inner side of one of the standards 6. Between the two lugs 30 30 (see dotted lines, Fig. 1) is a block 31, held against longitudinal movement thereby and carrying a set-screw 31', by which the block may be fastened upon the rod to hold the same against longitudinal movement. This portion of our device constitutes the means for adjusting the gage-plate 28 with respect to the plane of the cut-off wire 21. Before the plunger is moved forward the plate 28 is dropped into place, as shown by full lines in Figs. 1 and 3, and the butter is driven out from the box until the vertical end of the mass comes in contact with the gage-plate 28. The rotation of the wheel is then stopped, and the gage-plate is swung up out of the way into dotted-line position of Fig. 3.

The machine is regulated for producing prints of different sizes and weights by the simple adjustment of the gage-plate 28. The plate possesses the advantage of being out of the way when not in actual use as a gage.

The print or brick supporting or delivering device upon the machine comprises the right-angled arms 33 33 and the boards 34 and 35, perpendicular to one another secured to the arms 33 33. The board 34 is normally in the plane of the bottom board of the butter-box, and the board 35 normally stands at considerable distance in front of the box end, there being ample space for the gage-plate 28 and a spreader-board 36, upon which the prints are actually received. (This is shown only in Fig. 1, being omitted from Fig. 3.) The arms 33 33 are pivoted upon the lugs 2'' by means of pins 33', and the right-angled delivering-board is supported in its normal position by a notched lever 37, pivoted on the frame and engaged by a loop or hasp 38, attached to the board 35. When the lever 37 is lifted, the same is disengaged from the loop 38, and the delivery-board with its load of butter-prints is allowed to drop gently to approximately the position shown by dotted lines in Fig. 1. It should be noted that the operator by resisting the downward pressure upon lever 37 will without effort and almost unconsciously cushion the fall of the delivery-board. To restore the delivery-board to the full-line position, the operator raises the lever 37 and again locks the delivery-board thereby. There may be a stop-pin 37' on lever 37 to limit the fall of the delivery-board. 39 is a packing-board used for closing the end of the butter-box when the same is being filled with butter. This board is provided with a clamp 40 at its top for engaging the cross-bar 7 to securely hold the board in place as long as need be. The lower end of the board is held in place by pins or lugs which drop into the holes at the inner edge of the delivery-board 34. (See dotted lines, Fig. 1.)

The operation of our novel butter cutter and printer is as follows: The packing-board 39 is first placed in position and the plunger 14 is moved back to the rear end of the butter-box. Butter is then packed into the box, the same being nearly filled thereby. It is preferable that the level of the butter shall not rise to the height of the cross-bar 7. The packing-board 39 is then removed and the machine is ready to perform the printing operations. The gage-plate 28 having been previously adjusted or set, the wheel 12 is rotated to drive the plunger and the mass of butter forward in the box. This movement forces the butter past the cross-wires 17 and 20, which partially sever a plurality of prints or bricks from the mass. The rotation of hand-wheel 12 continues until the end of the mass of butter touches the plate 28. The wheel is then stopped and the gage-plate thrown upward and back out of the way. The next movement is that of throwing the crank or lever 26, which results in lifting the blocks 23, bow 22, and cut-off wire 21. A single upward and backward stroke of the crank 26' causes the complete severance of a plurality of prints or bricks, and the same will stand in a regular pile upon the delivery-board 34. The delivery-board is then dropped by means of the lever 37, and this movement deposits the bricks upon the spreader-board 36 wherewith they may be removed from the delivery-board. This having occurred, the delivery-board is restored to its upright position and the hand-wheel 12 is again turned to print another set of butter-bricks. The small irregularly-shaped pieces of butter cut by the upper wires 20 and 17 being too small and irregular for selling are discarded.

We generally arrange to mount our machine on a frame that is provided with truck-wheels or casters, so that it may be easily moved from place to place, but have not deemed it necessary to illustrate this manner of mounting the machine.

It will be obvious that numerous modifications of our invention will readily suggest themselves to one skilled in the art, and we therefore do not confine the invention to the specific constructions herein shown and described.

Having thus described our invention, we claim as new and desire to secure by Letters Patent—

1. In a butter cutting or printing machine, a butter-box and a plunger for expelling butter therefrom, in combination with wires stretched across the end of said box, guides upon the end of the box, a spring-bow having its ends slidably held upon said guides, a wire stretched upon the ends of said bow, and levers for operating said bow to move said wire across the end of said box, substantially as described.

2. In a butter cutting or printing machine, a butter-box and a plunger for expelling the butter therefrom, in combination with wires stretched across the open end of said box, guides upon the end of said box, a spring-bow having its ends slidable upon said guides, a cross-cut wire stretched between the ends of said bow, a rocking shaft above said box, arms thereon, means for turning said shaft and links connecting the free ends of said arms with the ends of said bow whereby upon the rotation of said shaft, said cross-wire will be moved across the end of said box, to sever prints of butter from the butter mass, substantially as described.

3. In a butter cutting or printing machine, a butter-box and means for expelling butter therefrom, in combination with butter-cutting wires arranged at the end of said box, a metallic frame having standards at the end of said box, said standards being provided with guides, a spring metal bow, blocks upon the ends of said bow and slidable upon said guides, a wire, having its ends fastened upon said blocks, and a crank and lever mechanism for sliding said blocks on said guides, substantially as and for the purpose specified.

4. In a butter cutting or printing machine, a butter-box and means for expelling butter therefrom, in combination with butter-severing wires at the delivery end of the box, standards provided with guides, a rocking shaft borne by the upper ends of said standards, crank-arms on said rocking shaft, links attached to said arms, blocks slidable upon said guides and whereto said links are attached, and a wire extending between said blocks, substantially as described.

5. In a butter cutting or printing machine, a butter-box and means for expelling butter therefrom, in combination with a butter-cutting device at the delivery end of said box, a metallic frame at the delivery end of the box, a gage-plate pivotally mounted upon the upper part of said frame and occupying a plane parallel with the end of the box, means for adjusting said gage-plate, and suitable print-delivering means, substantially as described.

6. In a butter cutting or printing machine, a butter-box, equipped with a butter-cutting device, a butter-expelling means a suitable butter-cut-off device, an adjustable gage-plate occupying a plane parallel to the plane of the said cutting device and the right-angled arm whereby said plate is movable and adjustably supported, substantially as described.

7. In a butter cutting or printing machine, a butter-box equipped with butter-cutting wires and butter-expelling means, in combination with a substantially right-angled delivery-board having a portion forming an extension of the bottom of said box, and means for lowering said board to deliver prints of butter in a substantially horizontal position, substantially as described.

8. In a butter cutting or printing machine, a butter-box equipped with butter expelling and cutting devices, in combination with a right-angled delivery-board pivoted upon said box, a catch-lever normally supporting said board and whereby said board may be gently lowered, substantially as described.

9. In a butter cutting or printing machine, a butter-box and butter-severing devices, in combination with an angular delivery-board pivoted upon said box, means normally supporting said board, and a lever whereby the operator may gently lower said delivery-board, substantially as described.

10. In a butter cutting or printing machine, a butter-box equipped with butter expelling and cutting devices, in combination with a gage, adapted to be positioned above and removable from the delivery end of said box, an angular delivery-board pivoted with relation to said box to receive a pile of prints or bricks, and a latch normally supporting said board in its upright position, said board being adapted to be lowered into substantially a horizontal position, as and for the purpose specified.

11. In a butter cutting or printing machine, a delivery-box and butter-cutting devices, in combination with an angular delivery-board adapted to receive and support a pile of prints or bricks, a receiving-board said angular board being adapted to be lowered to a substantially horizontal position to deposit said pile of bricks upon said receiving-board, substantially as described.

12. In a butter-cutting machine, a butter-box and cutting devices, in combination with an angular delivery-board having a horizontal pivoted support, a latch-lever and a part on said delivery-board to engage said lever whereby said board may be raised and lowered, substantially as described.

13. In a butter cutting or printing machine, a butter-box and cutting-wires, in combination with a plunger in said box, a standard adjacent to said box, lugs 30 on said standard, an angular rod, 29 29' arranged in said lugs, a block on said rod between said lugs, a set-screw in said block, and a gage-plate attached to said rod parallel with the cutting-wires of said box, substantially as described.

14. In a butter cutting and printing machine, a suitable frame and butter-box erected thereon, a plunger, means upon the box for operating said plunger, a metallic frame at the delivery end of said box, vertical guides upon said frame, vertical and horizontal wires stretched upon said frame across the end of said box, blocks slidable on said guides, a bow whereto said blocks are attached, a cross-cut wire stretched upon said blocks, a rocking shaft arranged upon said metallic frame above said box, arms upon said shaft, links connecting said arms with said blocks, manual means for operating said rock-shaft, a gage-plate adjustably supported upon said metallic frame, an angular delivery-board pivoted upon said frame, and a latch-lever for operating said delivery-board, substantially as described.

15. In a butter cutting or printing machine, a butter-box, in combination with a metallic frame at the delivery end of said box, said frame comprising the standards, 6 6 and the cross-bars, 2' 7, horizontal and vertical wires stretched between said standards and said bars respectively, guides upon said standards, a spring-bow, blocks upon the ends of said bow and guided upon said standards, a cross-cut wire stretched between said blocks, means for reciprocating said bow, a gage-plate provided upon said frame and shiftable into and out of operating position, and a suitable delivery-board, substantially as described.

16. In a butter cutting or printing machine, a suitable frame and a butter-box, in combination with cutting-wires stretched across the delivery ends of said box, a cross-cut wire and means for moving the same across the end of said box, means for discharging the butter from said box, a right-angled delivery-board pivoted upon said frame beneath said box to receive the prints of butter, a latch-lug on said board, a latch-lever pivoted beneath said board to engage said lug and a stop upon said latch-lever, substantially as described.

17. In a butter cutting or printing machine, a frame, in combination with a butter-box mounted upon said frame, a plunger in said box, a mechanism for moving said plunger in said box, a rigid frame at the discharge end of said box, cutting-wires stretched on said frame, a transverse reciprocating cutter and a crank mechanism for operating said transverse cutter, said crank mechanism having its pivotal support above said box, substantially as described.

18. In a butter cutting or printing machine, a butter-box with means for discharging butter therefrom, in combination with a rigid frame at the discharge end of said box, cutting-wires stretched on said frame, a gage-plate a supporting-arm for said gage-plate pivoted on said frame above said box and suitable butter-delivery means, substantially as described.

In testimony whereof witness my hand, this 21st day of December, 1904, at Chicago, Cook county, Illinois, in the presence of two witnesses.

FREDERICK J. MACNISH.

Witnesses:
E. D. HIGGS,
RALPH STODDARDS.

In testimony whereof witness my hand, this 23d day of December, 1904, at Lakemills, Jefferson county, Wisconsin, in the presence of two witnesses.

WILLIAM E. PENN.

Witnesses:
S. B. HOUSE,
A. M. SAECKER.